US011941735B2

(12) United States Patent
Alon et al.

(10) Patent No.: US 11,941,735 B2
(45) Date of Patent: *Mar. 26, 2024

(54) DISPLAY SYNCHRONIZATION USING COLORED ANCHORS

(71) Applicant: Sodyo Ltd., Binyamina (IL)

(72) Inventors: Alex Alon, Binyamina (IL); Irina Alon, Binyamina (IL); Eran Katz, Ramat-Hasharon (IL)

(73) Assignee: SODYO LTD., Binyamina (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,643

(22) Filed: Feb. 6, 2023

(65) Prior Publication Data

US 2023/0206526 A1    Jun. 29, 2023

Related U.S. Application Data

(60) Continuation of application No. 16/172,798, filed on Oct. 28, 2018, now Pat. No. 11,600,029, which is a
(Continued)

(51) Int. Cl.
*G09G 5/00* (2006.01)
*G06T 11/00* (2006.01)
*G06T 11/60* (2006.01)
*H04N 21/41* (2011.01)
*H04N 21/4223* (2011.01)
(Continued)

(52) U.S. Cl.
CPC .............. *G06T 11/60* (2013.01); *G06T 11/00* (2013.01); *H04N 21/4122* (2013.01); *H04N 21/4126* (2013.01); *H04N 21/4223* (2013.01); *H04N 21/43076* (2020.08); *H04N 21/44008* (2013.01); *H04N 21/658* (2013.01); *H04N 21/8133* (2013.01); *G06F 3/14* (2013.01)

(58) Field of Classification Search
CPC ................. G09G 5/14; G09G 2340/10; G09G 2340/125; G06T 11/60; G06T 15/503
USPC .................................................. 345/529, 629
See application file for complete search history.

(56) References Cited

U.S. PATENT DOCUMENTS 7,568,628 B2     8/2009  Wang et al.
7,619,990 B2 *  11/2009  Alicherry ................ H04L 45/04
                                                                370/254
(Continued)

FOREIGN PATENT DOCUMENTS

WO           9800980  A1     1/1998

OTHER PUBLICATIONS

CN Application # 2019800459653 Office Action dated Dec. 1, 2023.

*Primary Examiner* — Gordon G Liu
(74) *Attorney, Agent, or Firm* — Kligler & Associates

(57) ABSTRACT

A method for presenting information includes receiving a specified digital value for display, assigning to a set of colors respective digital codes comprising respective binary values representing three primary color components of the colors, and encoding the specified digital value by combining at least four of the digital codes while selecting the colors such that none of the binary values is constant over all of the selected colors. A symbol is presented for imaging by a computing device, the symbol comprising at least four regions meeting at a common vertex and having the colors selected so as to encode the specified digital value using the respective digital codes.

17 Claims, 8 Drawing Sheets

Related U.S. Application Data division of application No. 15/039,040, filed as application No. PCT/IB2014/066468 on Dec. 1, 2014, now Pat. No. 10,147,214, which is a continuation-in-part of application No. PCT/IB2013/054540, filed on Jun. 2, 2013.

(60) Provisional application No. 61/910,468, filed on Dec. 2, 2013, provisional application No. 61/656,029, filed on Jun. 6, 2012.

(51) Int. Cl.
*H04N 21/43* (2011.01)
*H04N 21/44* (2011.01)
*H04N 21/658* (2011.01)
*H04N 21/81* (2011.01)
*G06F 3/14* (2006.01)

(56) References Cited

U.S. PATENT DOCUMENTS

| | | | |
|---|---|---|---|
| 2004/0020989 A1* | 2/2004 | Muramatsu | G06K 19/06037 235/462.1 |
| 2006/0013502 A1* | 1/2006 | Weigand | H04N 1/40081 382/275 |
| 2011/0128288 A1* | 6/2011 | Petrou | G06V 10/235 345/428 |
| 2012/0039529 A1* | 2/2012 | Rujan | G06K 19/06103 382/164 |
| 2012/0063682 A1 | 3/2012 | Alacoque | |

* cited by examiner

DISPLAY SYNCHRONIZATION USING COLORED ANCHORS

CROSS-REFERENCE TO RELATED APPLICATIONS

This application is a continuation of U.S. patent application Ser. No. 16/172,798, filed Oct. 28, 2018, which is a division of U.S. patent application Ser. No. 15/039,040, filed May 25, 2016 (now U.S. Pat. No. 10,147,214), in the national phase of PCT Patent Application PCT/IB2014/066468, filed Dec. 1, 2014, which claims the benefit of U.S. Provisional Patent Application 61/910,468, filed Dec. 2, 2013. PCT Patent Application PCT/IB2014/066468 is a continuation in part of PCT Patent Application PCT/IB2013/054540, filed Jun. 2, 2013, which claims the benefit of U.S. Provisional Patent Application 61/656,029, filed Jun. 6, 2012. All of these related applications are incorporated herein by reference.

FIELD OF THE INVENTION

The present invention relates generally to methods, systems and software for image processing and display, and specifically to the use of machine-readable symbols in encoding and decoding of image information.

BACKGROUND

The term "second screen" commonly refers to the use of a personal electronic device, such as a tablet computer or smartphone, to enhance the experience of a person viewing content on another device, referred to in this context as the "first screen." (A second-screen device is sometimes referred to as a "companion device," and software applications supporting second-screen functionality may be referred to as "companion apps.") A second screen of this sort may include features that enable the viewer to interact with the content shown in the first screen, such as television shows, movies, music, or video games. For this purpose, the information displayed on the second screen is typically synchronized with the content being transmitted to the first screen.

SUMMARY

Embodiments of the present invention that are described hereinbelow provide improved types of computer-readable symbols, as well as methods for use of such symbols.

There is therefore provided, in accordance with an embodiment of the present invention, a method for distributing information, which includes producing a symbol to be overlaid on at least one primary image presented on a first display screen, the symbol encoding a specified digital value in a set of color elements having different, respective colors. A message is received from a client device containing an indication of the specified digital value decoded by the client device upon capturing and analyzing a secondary image of the first display screen. In response to the message, an item of information relating to the primary image is transmitted to the client device, for presentation on a second display screen associated with the client device.

In some embodiments, the symbol includes a plurality of regions meeting at a common vertex and having different, respective colors selected so as to encode the specified digital value, wherein the digital value is encoded by assigning to each color a three-bit code including respective binary values representing three primary color components of the colors of the regions, and combining the digital codes to give the specified digital value, and wherein the colors of the regions are selected such that none of the binary values is constant over all of the regions meeting at the common vertex. In a disclosed embodiment, the colors of the regions are selected from a color group consisting of red, green, blue, cyan, magenta, yellow, white and black.

In some embodiments, the symbol includes multiple sub-symbols, which are presented on the first display screen in different, mutually-separated locations, and which together encode the specified digital value. In one embodiment, the sub-symbols are presented in different, respective corners of the first display screen.

The at least one primary image may include either a stream of video images on which the symbol is overlaid or a digital still image.

Typically, transmitting the item of information includes causing the client device to overlay the item on the secondary image of the first display screen, which is displayed on the second display screen. In some embodiments, transmitting the item of information includes providing one or more interactive controls, to be overlaid on the secondary image so as to enable a user of the client device to actuate the interactive controls by operating a user interface of the client device. In a disclosed embodiment, providing the one or more interactive controls includes registering the interactive controls with respective features of the primary image as presented on the second display screen, and actuating the interactive controls includes invoking a selection function of the user interface at a location of one of the features of the at least one primary image on the second display screen.

In a disclosed embodiment, the message further contains an identification of a user of the client device, and transmitting the item of information includes selecting the item to transmit responsively to both the digital value and the identification of the user.

There is also provided, in accordance with an embodiment of the present invention, a method for displaying information, which includes capturing, using a client device, a secondary image of a first display screen on which at least one primary image is presented, overlaid by a symbol including a set of color elements having different, respective colors that encodes a digital value. The secondary image is processed in the client device so as to decode the digital value. A message containing an indication of the specified digital value is transmitted from the client device to a server. In response to the message, an item of information relating to the primary image is received and presented on a second display screen associated with the client device.

In some embodiments, presenting the item of information includes displaying the secondary image of the first display screen, and overlaying the item of information on the secondary image. In one embodiment, displaying the secondary image includes registering the first display screen with the second display screen on the client device using the symbol overlaid on the at least one primary image. Typically, registering the first display includes computing a transformation to be applied to the secondary image responsively to a disposition of the symbol in the secondary image, and applying the transformation in order to register the first display screen with the second display screen.

Additionally or alternatively, presenting the item of information includes detecting a selection by a user of the client device of a feature of the at least one primary image responsively to a gesture made by the user on the second display screen, and generating an output with respect to the feature responsively to the selection.

In some embodiments, capturing the secondary image includes adjusting an exposure level of a camera module in the client device in order to detect the symbol and decode the digital value. In one embodiment, adjusting the exposure level includes identifying an area having a greatest brightness value within the secondary image, and setting the exposure level so as to enable capture of the identified area. Additionally or alternatively, adjusting the exposure level includes cycling the camera module over multiple exposure levels until the symbol is detected and decoded.

In an alternative embodiment, the method includes receiving and storing in a cache on the client device items of information relating to one or more primary images, wherein presenting the item of information includes, when the item of information corresponding to the specified digital value is present in the cache, retrieving the item of information from the cache for presentation on the second display screen without transmitting the message to the server.

There is additionally provided, in accordance with an embodiment of the present invention, apparatus for distributing information, including a processor, configured to produce a symbol to be overlaid on at least one primary image presented on a first display screen, the symbol encoding a specified digital value in a set of color elements having different, respective colors. A communication interface is coupled to receive a message from a client device containing an indication of the specified digital value decoded by the client device upon capturing and analyzing a secondary image of the first display screen, and to transmit to the client device, in response to the message by the processor, an item of information relating to the primary image for presentation on a second display screen associated with the client device.

There is further provided, in accordance with an embodiment of the present invention, a device for displaying information, including a communication interface and a camera module, which is configured to capture a secondary image of a first display screen on which at least one primary image is presented, overlaid by a symbol including a set of color elements having different, respective colors that encodes a digital value. A processor is configured to process the secondary image so as to decode the digital value, to transmit a message via the communication interface to a server, the message containing an indication of the specified digital value, to receive, in response to the message, an item of information relating to the primary image, and to present the item of information on a second display screen associated with the client device.

In a disclosed embodiment, the device includes a memory, which is configured to receive and cache items of information relating to one or more primary images, wherein the processor is configured, when the item of information corresponding to the specified digital value is cached in the memory, to retrieve the item of information from the memory for presentation on the second display screen without transmitting the message to the server.

There is moreover provided, in accordance with an embodiment of the present invention, a computer software product, including a tangible, non-transitory computer-readable medium in which program instructions are stored, which instructions, when read by a computer, cause the computer to produce a symbol to be overlaid on at least one primary image presented on a first display screen, the symbol encoding a specified digital value in a set of color elements having different, respective colors, and upon receiving a message from a client device containing an indication of the specified digital value decoded by the client device upon capturing and analyzing a secondary image of the first display screen, to transmit to the client device, in response to the message, an item of information relating to the primary image for presentation on a second display screen associated with the client device.

There is furthermore provided, in accordance with an embodiment of the present invention, a computer software product, including a tangible, non-transitory computer-readable medium in which program instructions are stored, which instructions, when read by a computing device, cause the device to capture a secondary image of a first display screen on which at least one primary image is presented, overlaid by a symbol including a set of color elements having different, respective colors that encodes a digital value, to process the secondary image so as to decode the digital value, to transmit a message to a server, the message containing an indication of the specified digital value, and upon receiving, in response to the message, an item of information relating to the primary image, to present the item of information on a second display screen.

There is also provided, in accordance with an embodiment of the present invention, a method for encoding information, which includes specifying a digital value and providing a symbol including a plurality of regions meeting at a common vertex and having different, respective colors selected so as to encode the specified digital value. The digital value is encoded by assigning to each color a three-bit code including respective binary values representing three primary color components of the colors of the regions, and combining the digital codes to give the specified digital value. The colors of the regions are selected such that none of the binary values is constant over all of the regions meeting at the common vertex.

In a disclosed embodiment, the symbol includes multiple vertices encoding multiple, respective digital values depending on the colors of the regions that meet at each of the vertices, wherein the colors of the regions meeting at each of the multiple vertices are selected such that none of the binary values is constant over all of the regions meeting at any given vertex, and wherein the symbol encodes an extended digital value generated by combining the multiple, respective digital values encoded by the multiple vertices.

In some embodiments, the colors of the regions are selected from a color group including red, green, blue, cyan, magenta and yellow, and having three-bit codes (1,0,0), (0,1,0), (0,0,1), (0,1,1), (1,0,1) and (1,1,0), respectively. In a disclosed embodiment, the color group further includes black and white, having respective three-bit codes (0,0,0) and (1,1,1).

In some embodiments, the method includes capturing an image of the symbol, and decoding the symbol by probing the colors in the image at probe locations disposed at multiple angles around the common vertex. Typically, the probe locations are all disposed at the same distance from the common vertex.

In one embodiment, providing the symbol includes printing the symbol on a tangible medium. Alternatively or additionally, providing the symbol includes generating a signal so as to cause the symbol to be presented on an electronic display.

There is additionally provided, in accordance with an embodiment of the present invention, an information system, including a display, configured to present multiple symbols, each symbol including a plurality of regions meeting at a common vertex and having different, respective colors selected so that the symbols encode respective digital values. The digital value is encoded by assigning to each color a three-bit code including respective binary values representing three primary color components of the colors of the regions, and combining the digital codes to give the specified digital value. The colors of the regions are selected such that none of the binary values is constant over all of the regions meeting at the common vertex. The system also includes a server, configured to receive a message from a client device indicating a digital value decoded by the client device upon capturing and analyzing an image containing one of the symbols, and to provide to the client device, in response to the message, an item of information corresponding to the digital value.

Typically, the item includes a graphical element configured to be overlaid by the client device on a display of the image containing the one of the symbols.

There is further provided, in accordance with an embodiment of the present invention, a computer software product, including a tangible, non-transitory computer-readable medium in which program instructions are stored, which instructions, when read by a computing device, cause the device to capture an image of a symbol including a plurality of regions meeting at a common vertex and having different, respective colors selected so as to encode a specified digital value. The digital value is encoded by assigning to each color a three-bit code including respective binary values representing three primary color components of the colors of the regions, and combining the digital codes to give the specified digital value. The colors of the regions are selected such that none of the binary values is constant over all of the regions meeting at the common vertex. The instructions cause the computing device to process the image so as to decode the digital value.

There is moreover provided, in accordance with an embodiment of the present invention, a computing device, including an image sensor, configured to capture an image containing a symbol including a plurality of regions meeting at a common vertex and having different, respective colors selected so as to encode a specified digital value. The digital value is encoded by assigning to each color a three-bit code including respective binary values representing three primary color components of the colors of the regions, and combining the digital codes to give the specified digital value. The colors of the regions are selected such that none of the binary values is constant over all of the regions meeting at the common vertex. A processor is configured to process the image so as to decode the digital value.

In some embodiments, the device includes a display, which is coupled to display the image captured by the image sensor, wherein the processor is configured to superimpose a graphical element on the display responsively to the digital value.

Additionally or alternatively, the device includes a communication interface, wherein the processor is configured to send a message containing the digital value over a network to a server via the communication interface, and to receive the graphical element from the server in response to the message.

There is furthermore provided, in accordance with an embodiment of the present invention, a method for encoding information, which includes specifying a digital value and producing a symbol that encodes the specified digital value in a set of color elements having different, respective colors, to be identified in an image of the symbol as red, green, blue, cyan, magenta and yellow color elements, respectively, such that the color elements exhibit red, green, and blue intensity characteristics when measured in an sRGB color space that satisfy a relation:

$$\left(1 - \frac{H_c^0 - L_c^0}{L_c^1 - L_c^0} - \frac{H_c^1 - L_c^1}{H_c^1 - H_c^0}\right) > 0.8$$

for each color c=red, green, blue. Here $H_c^1$ and $L_c^1$ are the highest and lowest observed values, respectively, of the color c among the color elements that are expected to contain the color c, while $H_c^0$ and $L_c^0$ are the highest and lowest observed values of the color c among the color elements that are expected not to contain the color c.

In a disclosed embodiment, the respective colors of the color elements further include black and white, wherein the white color elements are expected to contain all of the colors c, while the black color elements are expected not to contain any of the colors c.

In disclosed embodiments, producing the symbol includes printing the symbol on a tangible medium or generating a signal so as to cause the symbol to be presented on an electronic display.

The present invention will be more fully understood from the following detailed description of the embodiments thereof, taken together with the drawings in which:

DETAILED DESCRIPTION OF EMBODIMENTS

Overview

Figure 1:
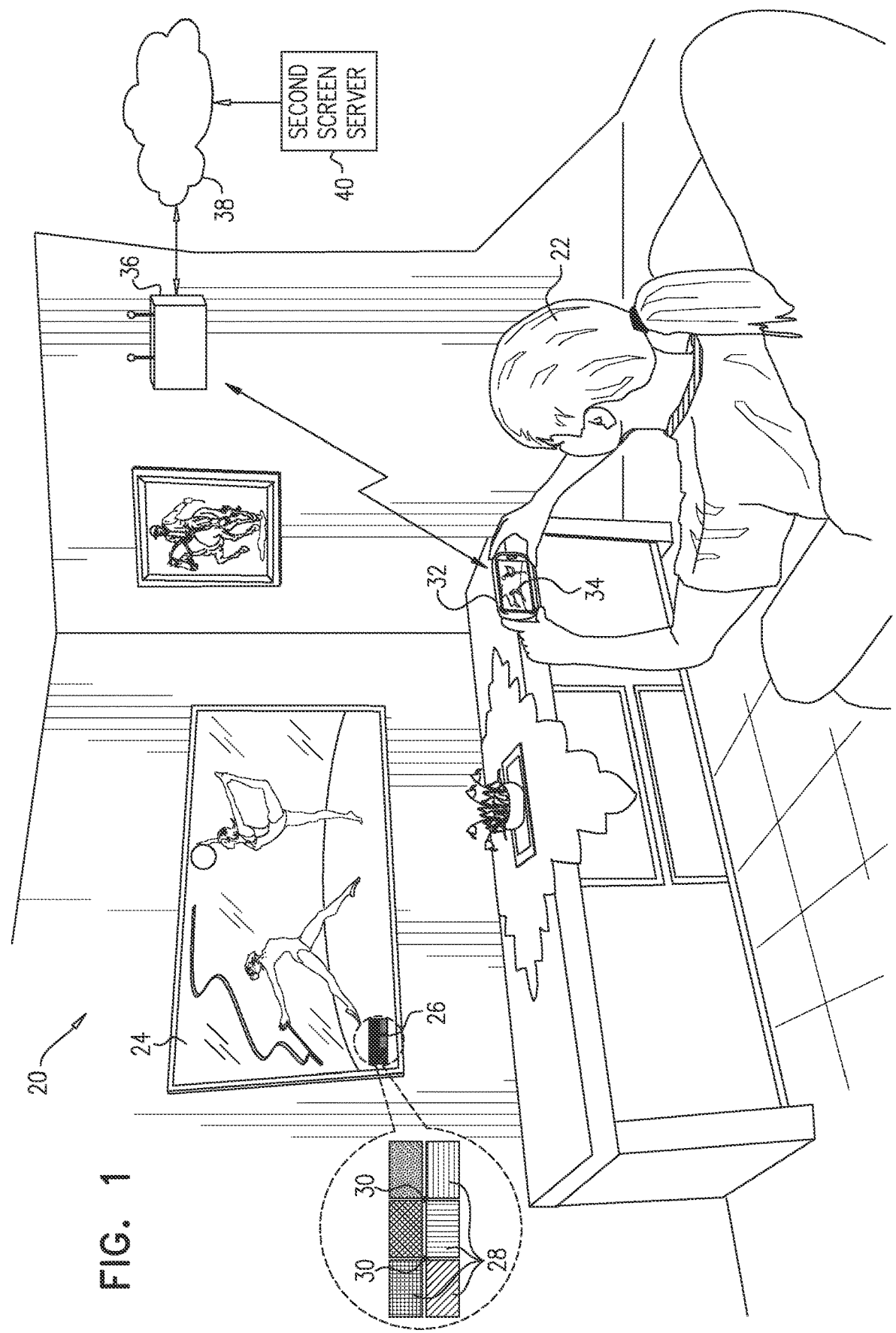
FIG. 1 is a schematic, pictorial illustration of a system for display synchronization, in accordance with an embodiment of the present invention.

Second-screen viewing has been found to enhance viewers' interest in and engagement with video programming. The quality of the second-screen experience, however, depends on how well the second screen is synchronized and meshes with the content being shown on the first screen.

In some embodiments of the present invention that are described hereinbelow, multi-color computer-readable symbols, referred to herein as "anchors," are embedded in a primary video stream in order to enable effective second-screen synchronization. The anchors are typically of the general type described in the above-mentioned PCT Patent Application PCT/IB2013/054540, possibly with enhancements that are described herein. An application running on a mobile computing device, which serves as the second-screen device (also referred to herein as the "client device"), uses the camera in the device to capture images of the primary video screen. The mobile computing device analyzes the images in order to extract a unique digital identifier that is encoded in the anchor, and uses the identifier in retrieving relevant information for the second-screen data. The information thus retrieved is typically presented on the mobile computing device, although it may be presented on another, auxiliary display device.

The information retrieved for the second-screen device typically includes additional content to be displayed on the second screen. Additionally or alternatively, the information may include relevant links (generally in the form of URLs) and/or data that configures the operation and capabilities of the mobile device application. These features may be applied to enable viewer participation in first-screen programs, for example by enabling users to vote directly in a reality show.

Additionally or alternatively, in some embodiments, the second-screen application enables users of mobile computing devices to add their own layers of information to the captured first-screen content stream. The information thus added can be related to a specific time or location within the captured stream, such as visual annotations. Users can disclose these additional layers of information to other users, thus increasing their engagement with the first-screen content and encouraging viral distribution through the Web and social networks.

In some embodiments, the image captured by the mobile computing device of the first-screen video stream is registered and displayed on the second screen. Typically, the mobile computing device uses the locations of the anchors themselves in the captured images of the first screen in order to compute and apply an appropriate geometrical transformation to register the first and second screens. When the first and second screens are registered, the second screen may superimpose an additional layer of enriched content on the first-screen images, possibly providing a kind of "augmented reality." For example, the second screen may add interactive capability to objects appearing on the first screen, so that when the user of the mobile computing device selects one of these objects, typically by an appropriate touch screen gesture, additional information related to the object is revealed on the second screen. The second-screen application running on the mobile computing device may thus use the touch screen of the device to create a sort of "virtual touch screen" over the first-screen display.

In order to optimally detect the anchors and capture the information that they contain, some embodiments of the present invention also provide methods and algorithms to set the exposure and focal point of the camera in the mobile computing device. Anchor designs that are optimized, in terms of color and geometry, for first-screen display and detection are also provided.

The terms "first screen" and "second screen" are used in the present description, for the sake of convenience, to refer respectively to a primary display of image content and a secondary display on a mobile computing device. These terms should not be understood as in any way limiting the applicability of the techniques that are described herein to the accepted first screen/second screen model of television viewing that is described above in the Background Section. Rather, the principles of the present invention may be applied to add interactive information and capabilities to substantially any sort of image display, including, for example, screens used to display entertainment and promotional content in public venues. The images presented on such "first-screen" displays are referred to herein, for the sake of convenience and clarity, as "primary images," while the images of such displays that are captured by mobile computing devices are referred to as "secondary images." By the same token, the server responsible for providing second-screen data to such mobile computing devices is referred to as the "second-screen server," while the mobile devices themselves may be referred to in this context as "client devices." In the embodiments illustrated in the figures, the client devices comprise smartphones or tablet computers, but alternatively, substantially any sort of computing device with suitable image capture and display capabilities can serve as a client device in this context.

Thus, in embodiments of the present invention that are described herein, a second-screen server produces symbols to be overlaid on primary images that are presented on a display screen. These primary images may be digital still images or streams of images, such as video streams. Each such symbol encodes a specified digital value by means of a set of color elements having certain different, respective colors. Client devices capture their own secondary images of this display screen and process these images in order to decode the digital value and transmit a message containing an indication of this value to the second-screen server. Upon receiving the message, the server transmits to the client device an item of information relating to the primary image for presentation on a display screen associated with the client device—typically the built-in display screen of the client device itself, although alternatively, a separate, auxiliary screen may be used for this purpose.

Alternatively or additionally, the client device may download and cache second-screen information in its own memory. In this case, upon decoding a digital value that is encoded in a symbol on the first screen, the client device will check its cache for the corresponding item of information and, if the item is found in the cache, will display it without transmitting a message to the second-screen server. Otherwise, the process of message transmission and second-screen information download will proceed as described above.

Typically, the message transmitted by the client device to the server also contains an identification of the user of the client device. The server may then select the item to transmit to the client device based both on the digital value, which identifies the primary image, and on the identification of the user. The term "item of information," in the context of the present description and in the claims, refers not only to textual and pictorial information relating to the primary image, but also to interactive information, which may include links and program code.

In the disclosed embodiments, each symbol comprises a plurality of regions meeting at a common vertex and having different, respective colors selected so as to encode the specified digital value. The digital value is typically encoded by assigning to each color a three-bit code, comprising respective binary values representing three primary color components of the colors of the regions, and combining the digital codes to give the specified digital value. For example, the colors of the regions may be selected from a color group consisting of red, green, blue, cyan, magenta, yellow, white and black, with the limitation that none of the binary values is constant over all of the regions meeting at the common vertex. Although polygonal regions are advantageous in this context, as described in the above-mentioned PCT Patent Application PCT/IB2013/054540, other shapes having a common vertex may alternatively be used.

In some embodiments, the symbol that is overlaid on the primary image comprises multiple sub-symbols, which together encode the specified digital value. In order to avoid overlaying important parts of the primary image, the sub-symbols may be presented on the display screen in different, mutually-separated locations, such as in different, respective corners of the first display screen.

The client device may process the symbols (or sub-symbols) appearing on the display screen not only to decode the symbols, but also to register the secondary image that it has captured of the primary display screen with the display screen of the client device itself. Typically, this registration involves computing and applying a transformation to the secondary image in order to account for relative displacement and viewing angle. Once the images are registered, it is possible for the client device to overlay interactive controls on the secondary image, and to enable the user of the client device to actuate the interactive controls by operating a user interface, such as a touch screen, of the client device. The user controls may then take the form of touch-sensitive areas on the screen of the client device that are aligned with features of the primary image that appear on the second display screen. The user can activate these controls by invoking the selection function of the touch screen or other user interface. In this manner, the client device provides the sort of virtual touch screen functionality over the primary image that is mentioned above. Alternatively or additionally, the client device may overlay on the display that is associated with the client device substantially any other suitable items of information provided by the second-screen server, including both user controls and ancillary information.

System Description

FIG. 1 is a schematic, pictorial illustration of a system 20 for display synchronization, in accordance with an embodiment of the present invention. A user 22 views a primary image that is presented on a first display screen 24—in this case, a television program shown on a video screen. The primary image stream is overlaid by a symbol 26, which comprises multiple regions 28 of different colors, which meet at vertices 30. (The different colors are represented in this figure and throughout the application by different styles of hatching.) Although symbol 26 in the pictured examples comprises a 3×2 grid of rectangular regions 28, the symbols used in this and other embodiments of the present invention may comprise grids of other dimensions (for example, 3×3) and may alternatively comprise regions of other shapes.

Symbol 26 encodes a specified digital value, in a manner similar to that described in the above-mentioned PCT Patent Application PCT/IB2013/054540. Briefly stated, each color is assigned a three-bit code, which comprises respective binary values representing three primary color components (red, green and blue) of the colors of the regions. The individual digital codes of the regions 28 surrounding each vertex 30 are combined, typically by concatenation, to give a corresponding digital value. When the symbol comprises multiple vertices 30, as in the present example, the specified digital value is obtained by combining (again, typically by concatenation) the digital values encoded by the individual vertices.

As described in PCT/IB2013/054540, the colors of regions 28 may conveniently be selected from a color group comprising red, green, blue, cyan, magenta and yellow, with corresponding three-bit codes (1,0,0), (0,1,0), (0,0,1), (0,1,1), (1,0,1) and (1,1,0), respectively. This color group can advantageously be extended by the inclusion of black and white, having respective three-bit codes (0,0,0) and (1,1,1). Different symbol types and methods for generating such symbols are described further hereinbelow.

In the pictured embodiment, user 22 aims and operates the camera module in a mobile computing device 32 to capture an image (referred to herein as a "secondary image") of display screen 24. This captured image is presented on a display screen 34 of device 32, which processes the image in order to decode the digital value that is encoded by symbol 26. Device 32 transmits a message containing an indication of this digital value (which may be simply the value itself, or a number or code derived from the value) over a network 38, such as the Internet, to a second-screen server 40. Typically, the message also contains information identifying user 22. In the pictured example, device 32 transmits the message over the air to a wireless access point 36, which then conveys the message to network 38. Alternatively, device 32 may communicate with server 40 via a cellular network, a wired network connection, or any other suitable sort of link that is known in the art. In response to this message, server 40 returns an item of information relating to the primary image to device 32 over network 38, for presentation on display screen 34.

Figure 2:
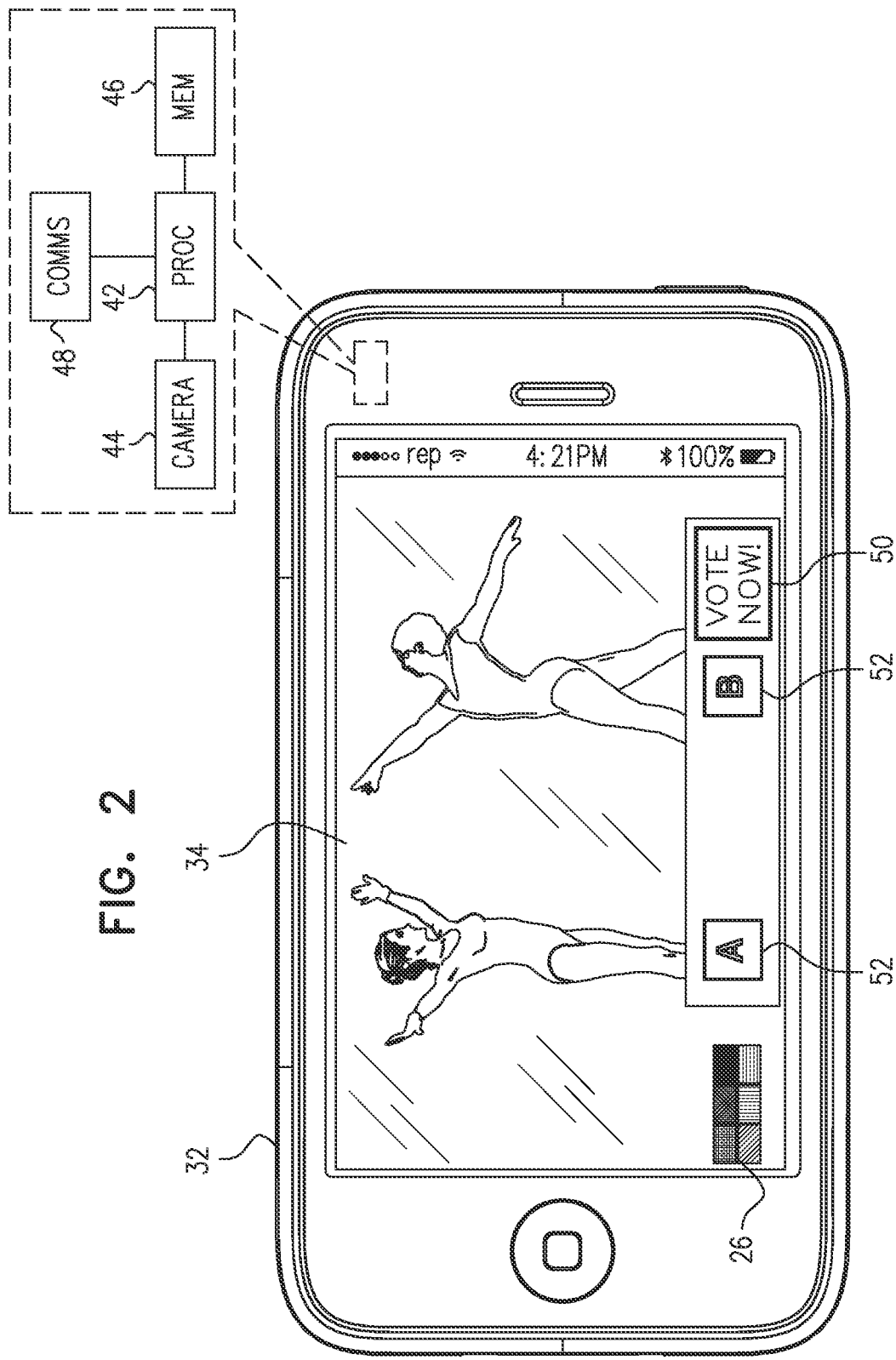
FIG. 2 is a schematic frontal view of a second-screen device, in accordance with an embodiment of the present invention.

FIG. 2 is a schematic frontal view of mobile computing device 32, in accordance with an embodiment of the present invention. Device 32 in this embodiment is a standard smartphone, which comprises a processor 42, along with an associated camera module 44 (alternatively referred to simply as a camera), memory 46, and communications interface 48. Processor 42 carries out the functions that are described herein under the control of software, such as an application program ("app"), that is stored in memory 46. This software may be downloaded to device 32 in electronic form, over network 38, for example. Additionally or alternatively, the software may be provided and/or stored in device 32 on tangible, non-transitory memory media, such as optical, electronic or magnetic memory.

The item of information provided by server 40 in this example comprises an interactive voting bar 50, which is overlaid by processor 42 on the secondary image that is displayed on screen 34. Bar 50 contains voting buttons 52, which user 22 can activate by means of a selection function provided by the user interface of device 32. For example, assuming screen 34 is a touch screen, as in most such mobile devices, user 22 can simply press the button of choice on the screen itself. For this purpose, the locations of buttons 52 are registered with the locations of corresponding features of the primary image that are reproduced on screen 34—in this case, the locations of the contestants for whom user 22 may vote. Alternatively, however, the voting buttons may be displayed at any other convenient location on screen 34, and the user may actuate the buttons either by pressing the buttons on screen, as noted above, or by use of another pointing device or keyboard (not shown) that is a part of or is connected to device 32. (Although symbol 26 is also shown on screen 34 in the present example, this symbol need not generally be shown on the second-screen display.)

Figure 3:
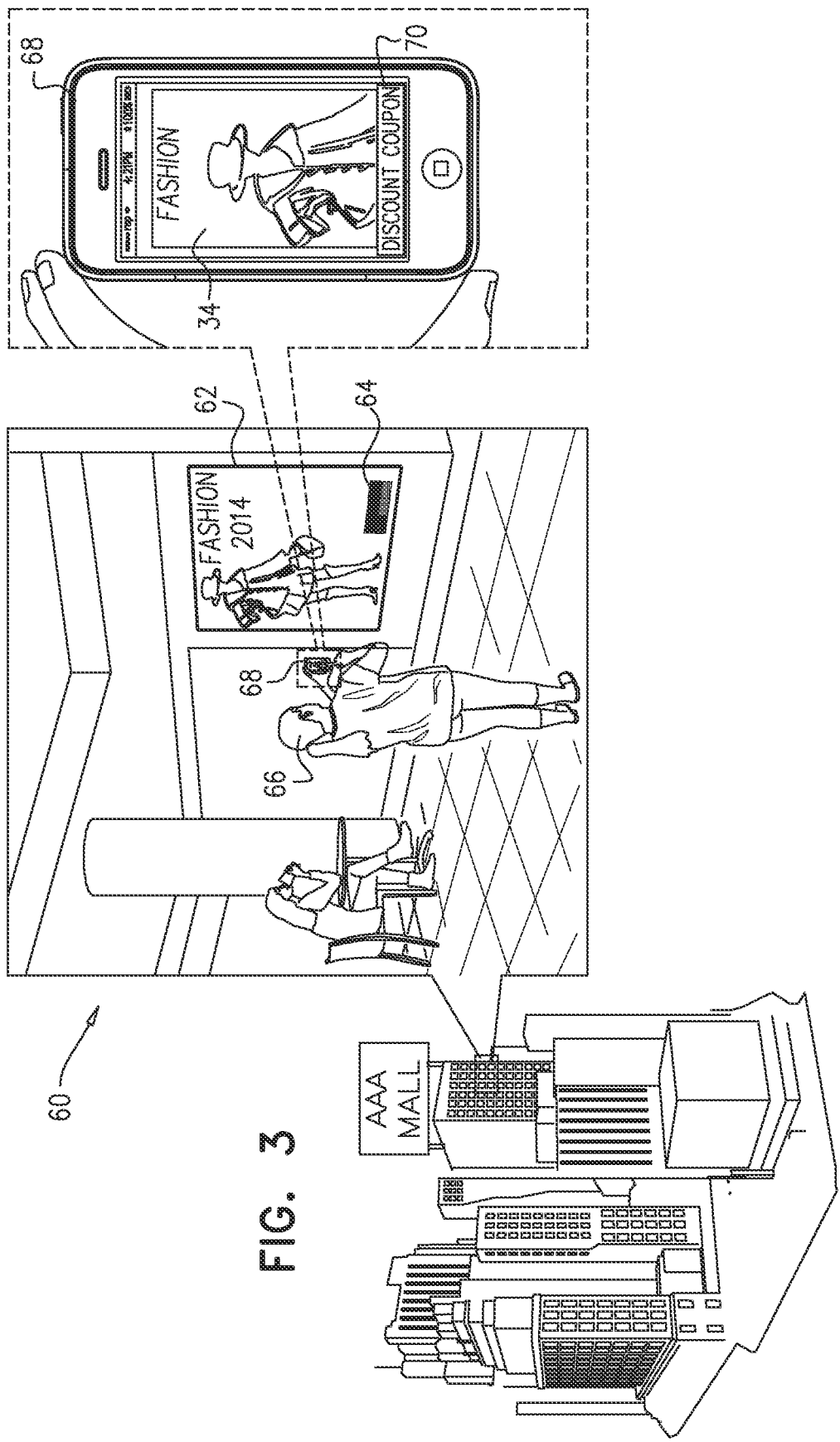
FIG. 3 is a schematic, pictorial illustration of a system for display synchronization, in accordance with another embodiment of the present invention.

FIG. 3 is a schematic, pictorial illustration of a system 60 for display synchronization, in accordance with another embodiment of the present invention. The elements of system 60 are similar to those of system 20, described above, and elements such as server 40 are omitted from FIG. 3 for the sake of simplicity.

In contrast to system 20, system 60 is deployed in a public location, such as a shopping mall. A digital display 62 presents promotional content, comprising still or video primary images, overlaid with a symbol 64, in a form similar to symbol 26 described above. A user 66 passing by display 62 captures an image of the display using her mobile computing device 68. The processor in device 68 decodes symbol 64 and transmits a message to the second-screen server indicating the decoded digital value and identifying user 66. As in the preceding embodiment, the image of display 62 is reproduced on screen 34.

In response to the message from device 68, the second-screen server returns an item of information in the form of an offer of a discount coupon 70. Device 68 displays this offer on screen 34. To activate and use the coupon, user 66 operates the user interface of device 68, for example by pressing the area of coupon 70 on screen 34. The user may then be directed to the store where she can redeem the coupon against a purchase.

The figures above present two simple examples of interactive content that may be presented on screen 34 of a mobile client device. Other sorts of interactive content that may be presented in this manner include:

- A telephone number, with a link that can be selected ("clicked") to call the number and/or to save the information to the user's contact list.
- An address, with a link that can be selected to open a navigation application to the address.
- An event, with a link that can be selected to save the event in the user's calendar.
- A link to the user's social network account.
- A sales offer, with a link that can be selected to buy the article on sale.
- A suggested search, with a link to a search engine.
- Feedback from users, with a link enabling users to read and/or write reviews.

As explained above and illustrated in FIG. 2, the interactive user controls that are presented on screen 34 may be registered with the locations of actual features of the primary image, as reproduced on screen 34, to which the controls related. Furthermore, when screen 24 or 62 shows moving video content, such that the features of the primary image (for example, people in the image) move from frame to frame, the overlaid controls may move with them. For example a rectangular mark can be added over a given object in the image of the first display screen that is shown on screen 34 to indicate the location of the user control, and can be made to follow that object as it moves. When the user presses or otherwise clicks on the mark, the information item relating to the given object is actuated.

On-Screen Anchor Design and Processing

Various sorts of symbols may be used as anchors in embodiments of the present invention. Examples include symbols 26 and 64, as shown above, as well as other sorts of symbols described hereinbelow and the symbol types that are shown and described in the above-mentioned PCT Patent Application PCT/IB2013/054540. The symbols in the present embodiments use a spectrum of eight colors: red, green, blue, cyan, magenta, yellow, black and white. Alternatively, larger or smaller sets of colors may be used.

A given vertex in a symbol may be used to encode a large number of different digital values, depending on the number of colors used and the number of regions that meet at the vertex. When a symbol comprises multiple vertices, each vertex encodes a respective digital value, and these values are combined to generate an extended digital value, for example by concatenating the individual values of the vertices. Symbols containing larger numbers of vertices may be used to encode larger values.

A key advantage of the sort of color-based, vertex-centered encoding that is illustrated by the symbols described herein (particularly relative to image-based encoding schemes, such as QR codes, that are known in the art) is that the decoding is largely scale-invariant. In other words, the relative size of the symbol in the image captured by the mobile computing device, and hence the distance between the device and the symbol, has little or no impact on decoding over a large range of sizes.

To read the digital value encoded by a candidate vertex, for example, processor 42 may select a candidate vertex location and then compute the respective color at a sampling point in each region around the vertex at a certain displacement from the vertex. These sampling points, referred to herein as probes or probe locations, are generally located along the angle bisectors between the color edges of the regions. The number of probes and the angles between them are thus determined by the type and number of regions around each vertex. (The candidate vertex locations, around which the sampling points are taken, may be found by locating the color edges that meet at the vertex and taking the location at the intersection of the color edges, or they may be chosen by any other suitable criterion or even at random.) As long as the colored regions are not smaller than a certain displacement vector D, color probing of the regions at such a displacement will yield the same colors regardless of the scale.

This sort of vertex-centered encoding is also robust to rotations: As long as the rotation is smaller than half of the smallest vertex angle (for example, less than 45° for a rectangular tessellation of the sort illustrated by symbols 26 and 64), there is no need to adjust the color probing direction along the angle bisectors. Information provided by an inertial sensor (such as an accelerometer) that is available in most smartphones and other mobile computing devices can be used to disambiguate and correct the color probing angle regardless of rotation of the camera itself. The vertices themselves serve as registration marks, so that there is no need for additional registration marks to be added to the symbols.

Substantially any set of colors that can be distinguished by an image sensor can be used to color the regions around the vertices in symbols according to embodiments of the present invention. The inventors have found, however, that the specific family of color schemes that is described herein is advantageous in supporting reliable, efficient color identification using commonly-available image sensors. Such color schemes are useful not only in this particular encoding method, however, but also in other techniques of color-based encoding.

In one embodiment of the invention, the number of colors is set to $N_c=8$, using the set of primary colors "Red" (R), "Green" (G) and "Blue" (B) and their respective complements "Magenta" (M), "Cyan" (C) and "Yellow" (Y), as well as white (W) and black (K). This color-set has several advantages:

Primary colors, and even more so, interfaces joining several such colors, are relatively rare in natural environments. This feature is beneficial for the identification of anchors by humans and computers and aids in robust decoding.

RGB is the native color-space of digital images generated by cameras. The complementary colors can be easily computed as M=G+B, C=R+B, Y=R+G.

As explained in the above-mentioned PCT Patent Application PCT/IB2013/054540, $N_c$=6 is sufficient for rectangular, hexagonal and triangular tessellations; but $N_c$=8 adds further versatility and scope to the range of symbols that can be used and digital values that can be represented.

The present embodiments use a three-dimensional binary presentation of the colors:
1. R=(1,0,0)
2. G=(0,1,0)
3. B=(0,0,1)
4. C=(0,1,1)
5. M=(1,0,1)
6. Y=(1,1,0)
7. W=(1,1,1)
8. K=(0,0,0)

Each of the three dimensions represents a Primary Color Channel (PCC)—red, green or blue.

In the present embodiments, the colors surrounding any given common vertex are all required to be different from one another and to vary in the binary representation of each of the PCCs, i.e., a vertex around which all the surrounding colors have the same R, G or B bit value is not permitted. For example a vertex of four tiles of colors R, G, B complies with the criterion since no binary PCC is constant for all tiles. On the other hand, three tiles of colors C, G, B do not comply with the criterion, since the red binary PCC is zero for all of them. This limitation is useful in ensuring reliable vertex identification and decoding.

Rectangular tessellation of symbols is advantageous because it geometrically matches the tessellation of the sensor elements that are used in imaging the symbols and also tends to match the spaces available for posting anchors in common images. The rectangular tiles may readily be extended horizontally in order to compensate for the horizontal foreshortening that may result when images of the anchor are captured at an angle, as will often be the case, rather than head-on.

In the embodiments described above and shown in the figures, server 40 provides the symbols to be used as anchors by generating a signal so as to cause the symbol to be presented on an electronic display (such as screens 24 and 62). Alternatively, however, the principles of symbol generation that are described herein may be applied, mutatis mutandis, to symbols printed on tangible media. The above-mentioned PCT/IB2013/054540 describes in detail how such symbols may be printed using types of pigments that are known in the art.

In addition to decoding the digital values of the symbols overlaid on the primary image, processor 42 can use these symbols in performing fast and robust detection and registration of the primary images in the video stream captured by camera 44. The position and orientation of a given symbol in the secondary images captured by the camera are a result of six degrees of freedom: three rotations and three translations. The coordinates of each detected vertex 30 (referred to as a color vertex point, or CVP) in the primary image correspond to two parameters in the secondary image, i.e., the row and column position of the CVP in the image frame captured by camera 44. Thus, any anchor that comprises three or more CVPs—whether in a single symbol or a combination of sub-symbols—provides sufficient information to enable processor 42 to resolve the rotational and translational degrees of freedom governing the position and orientation of the anchor in the video stream. In this manner, processor 42 is able to detect and register the location of the first screen (screen 24 or 62) relative to the second screen (screen 34).

Furthermore, mobile computing devices contain sensors, such as accelerometers, that provide motion and orientation parameters of the device. At the same time, first-screen displays are commonly positioned in a vertical orientation, with their width direction parallel to the ground. Using this additional information, the six degrees of freedom in the relative locations and orientations of the first and second screens are reduced to four, so that detection of an anchor that comprises two or more CVPs (such as anchor 26 or 64) is sufficient to resolve the remaining degrees of freedom. The shape of the first screen detected in the captured image may also be used in this regard. The resolution and accuracy of the relative locations and orientations of the first and second screens may still depend, however, on factors such as the spacing between the vertices.

Figure 4:
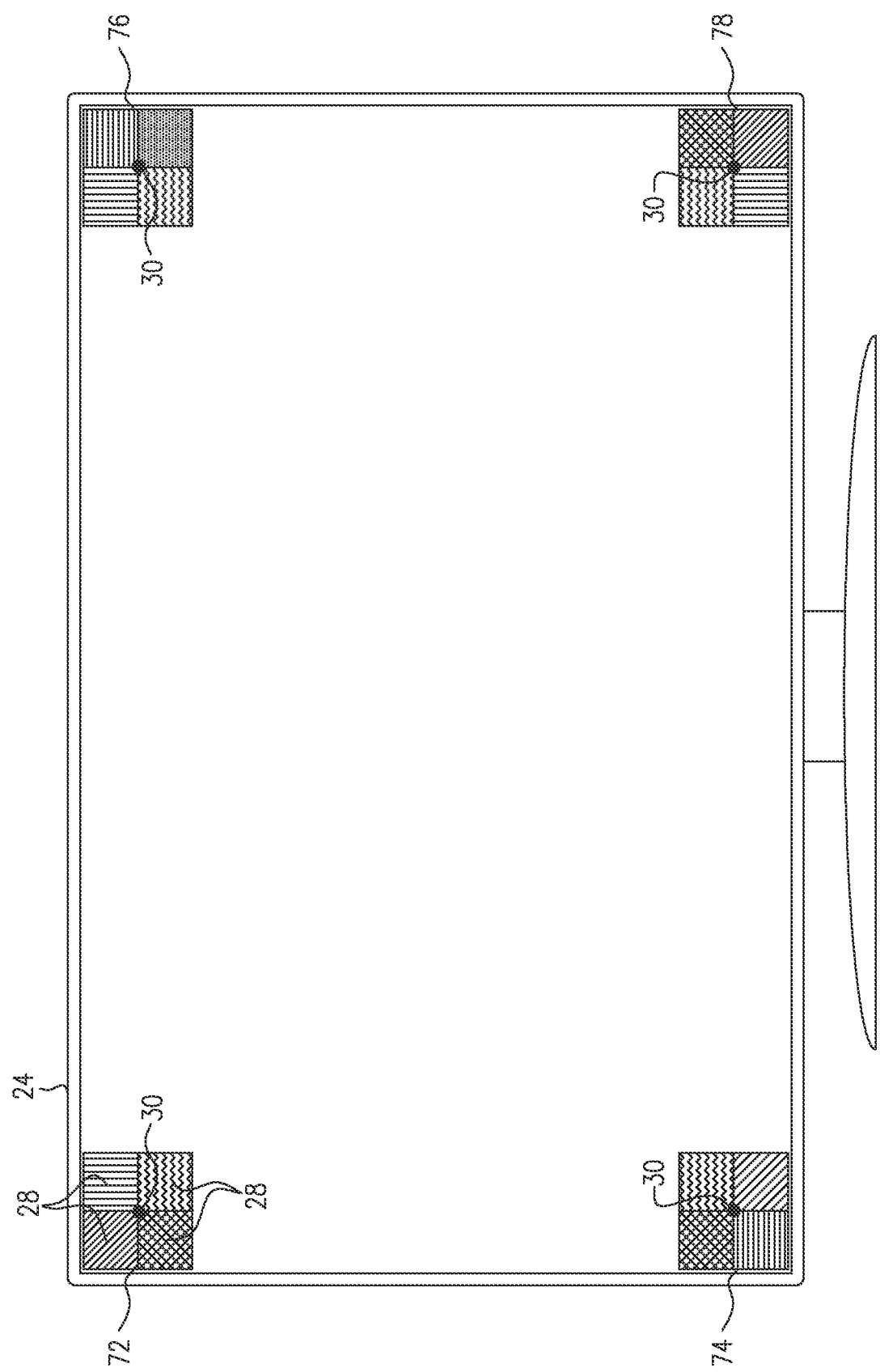
FIG. 4 is a schematic, frontal view of a video screen on which multi-color computer-readable symbols are displayed, in accordance with an embodiment of the present invention.

FIG. 4 is a schematic, frontal view of video screen 24, on which multi-color computer-readable symbols 72, 74, 76 and 78 are displayed, in accordance with an embodiment of the present invention. Symbols 72, 74, 76 and 78 can be seen as sub-symbols of a single distributed symbol, or anchor, whose corresponding digital value is a combination of the individual values encoded by vertices 30 of the sub-symbol. This arrangement has the advantage that the sub-symbols take up minimal space in the corners of screen 24, where they are least likely to interfere with the primary image on the display. Furthermore, the large distance between vertices 30 will result in large differences between the respective row and column coordinates of the vertices in the secondary image, thus enhancing the accuracy of computation of the rotational and translational transformations needed to register the first and second screens.

Figure 5:
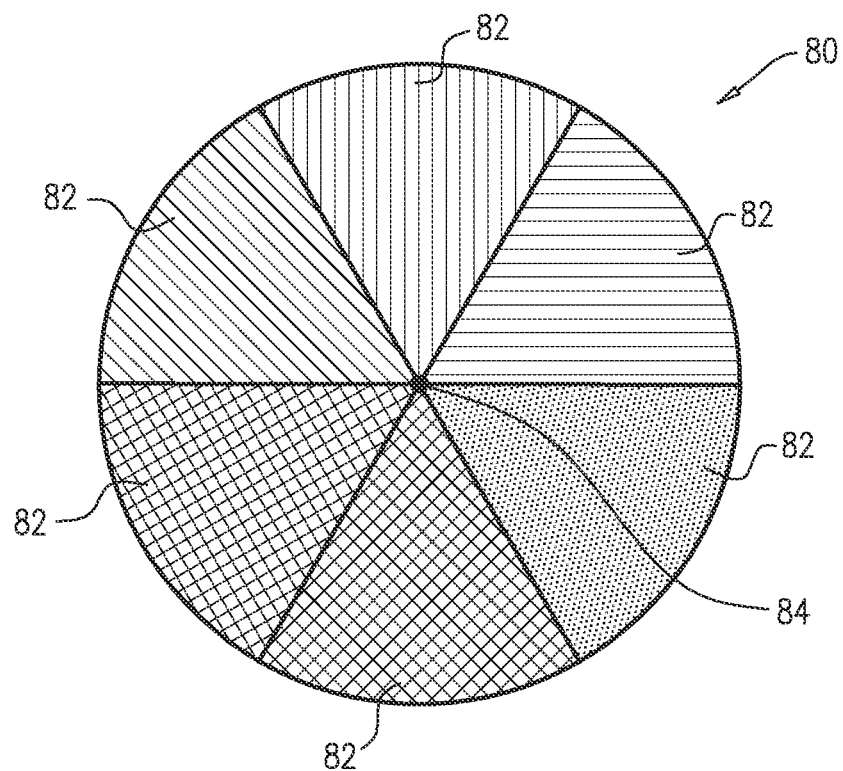
FIGS. 5 and 6 are schematic representations of multi-color computer-readable symbols, in accordance with other embodiments of the present invention.

FIG. 5 is a schematic representation of a multi-color computer-readable symbol 80, in accordance with another embodiment of the present invention. Symbol 80 comprises colored regions 82 shaped as sectors of a disk, which meet at a common vertex 84. This disk-shaped symbol may be esthetically and functionally advantageous in some embodiments. It illustrates that embodiments of the present invention are in no way limited to symbols made up of polygonal regions, but may alternatively use regions of any suitable shape so long as they define a CVP.

Figure 6:
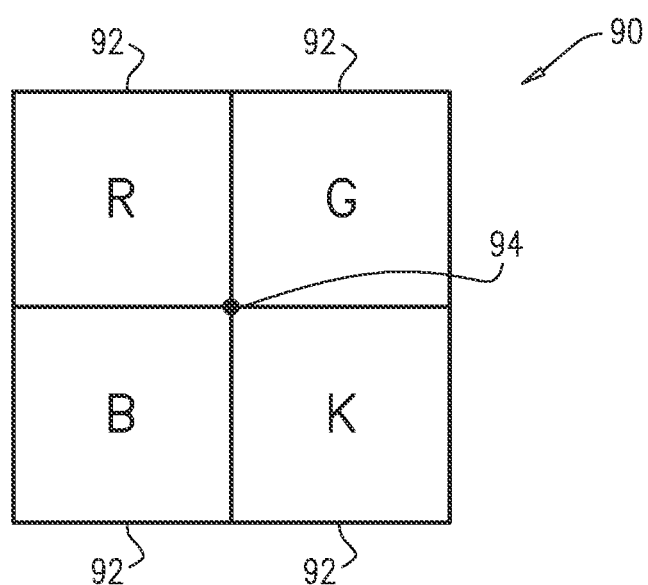

FIG. 6 is a schematic representation of a multi-color computer-readable symbol 90, in accordance with yet another embodiment of the present invention. Symbol 90 comprises red, green, blue and black regions 92, which meet at vertex 94. This symbol complies with the criterion set forth above that no PCC be constant over all of the regions surrounding the vertex. Another symbol of this sort (not shown) could comprise cyan, yellow, magenta and white regions. On the other hand, a symbol comprising cyan, green, blue and black regions would not be desirable, since the red PCC is zero over all regions.

In practical terms, the colors produced by the pixel filters in a display screen or by a set of color pigments are not pure colors, but rather tend to cover broad regions of the spectrum. Robust detection of vertices can be affected strongly by the actual choice of colors in the display or printed image. In order to optimize the choice of colors used in generating symbols for display, the inventors have developed a method to score a color set. The method scores a color set according to the actual RGB values of the anchor symbols created from the color set in a captured image, or alternatively uses the sRGB color space to predict these values. (The sRGB color space is defined by IEC Specification 61966-2-1:1999 and is commonly used in calibrating color image sensors and cameras.) The color set for the anchor symbols is then chosen in a way that optimizes the score.

To compute the score, for a given set of RGBCMYKW colors, $H^1_c$ and $L^1_c$ are taken, respectively, to be the highest and lowest observed values of a color c that is 1 in the binary representation of the color set. Similarly, $H^0_c$ and $L^0_c$ are the highest and lowest observed values of a color c that is 0 in the binary representation of the color set. In other words, $H^1_c$ and $L^1_c$ are the highest and lowest observed values, respectively, of the color c among the color elements (including white) that are expected to contain the color c, while $H^0_e$ and $L^0_c$ are the highest and lowest observed values of the color c among the color elements (including black) that are expected not to contain the color c. For c=red, for example, red, yellow, magenta and white color elements are expected to contain this color, while green, blue, cyan and black color elements are expected not to contain it.

Stringent choice of the spectral distinction between the colors used in symbols reduces significantly the chance of encountering a false positive vertex, thus increasing the reliability of vertex detection. The most stringent choice can be found by choosing the colors so as to maximize a reliability score given by:

$$S^{reliability} \equiv \prod_c \left(1 - \frac{H^0_c - L^0_c}{L^1_c - L^0_c} - \frac{H^1_c - L^1_c}{H^1_c - H^0_c}\right)$$

Another advantageous result of the use of the scoring criterion described above is that all the intensity values of the resulting colors are clustered around either a particular low value or a particular high value, but not in between. Common color schemes that are known in the art do not exhibit this sort of behavior. Using the reliability score defined above, color sets can generally be defined such that the component of $$S^{reliability}, \left(1 - \frac{H^0_c - L^0_c}{L^1_c - L^0_c} - \frac{H^1_c - L^1_c}{H^1_c - H^0_c}\right),$$

for any PCC c (red, green or blue) is greater than 0.8.

As noted earlier, although the above color schemes are described here specifically with reference to vertex-based encoding methods, the same sort of scheme can be used in producing other sorts of color elements used in other color-based encoding schemes.

System Operation

Figure 7:
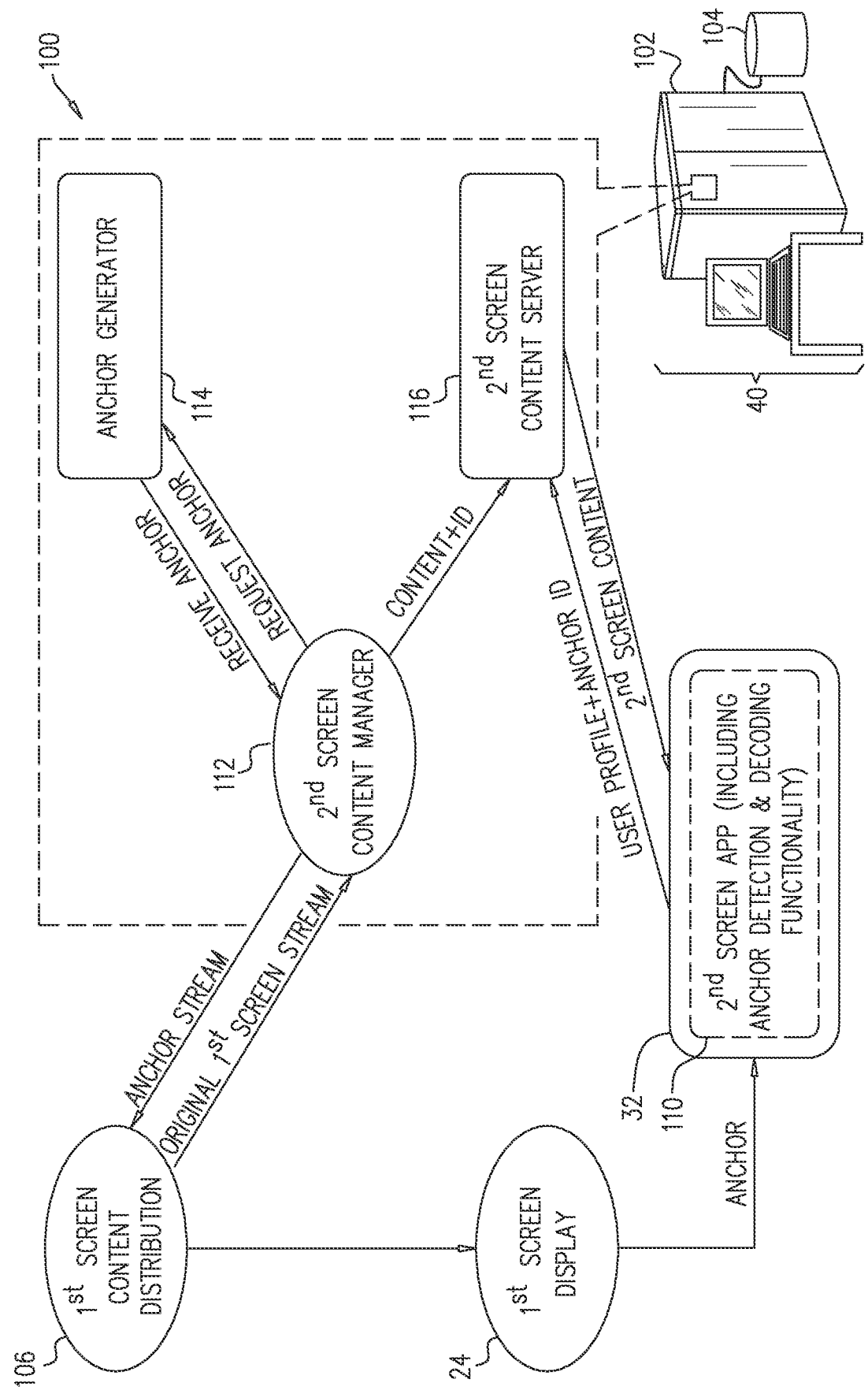
FIG. 7 is a block diagram that schematically illustrates a system for display synchronization, in accordance with an embodiment of the present invention.

FIG. 7 is a block diagram that schematically illustrates a system 100 for display synchronization, in accordance with an embodiment of the present invention. The functional elements of system 100 that are shown in FIG. 7 correspond roughly to the physical elements of system 20 that are shown in FIG. 1. FIG. 7 is intended to illustrate one possible, non-limiting implementation of methods for second-screen display and interaction using the anchors and functionalities described herein. Alternative implementations will be apparent to those skilled in the art and are considered to be within the scope of the present invention.

System 100 is built around second-screen server 40, which typically comprises one or more general-purpose computers, including at least one processor 102, memory 104, and suitable interfaces for carrying out the functions described herein. Processor 102 performs these functions under the control of software, which may be downloaded to server 40 in electronic form, over a network, for example, and/or stored on tangible, non-transitory media, such as optical, magnetic, or electronic memory media. The functional blocks of server 40 that are shown in FIG. 7 are typically implemented as software processes or other software entities, which may run on the same or different processors.

Server 40 interacts with a first-screen content distributor 106, such as a distributor of video programming or promotional images, for example. Server 40 typically works with multiple content distributors of this sort. Alternatively, however, the functions of second-screen server 40 may be integrated with the content-distribution servers of distributor 106.

To insert anchors and associate second-screen content with a given first-screen image or program, a second screen manager 112 on server 40 creates a new session and passes the session information to an anchor generator 114 on the server. This session information typically comprises a unique session ID (typically related to the first-screen content with which the second-screen content is to be associated), as well as ancillary information such as the length of the first-screen program, the transmission format and resolution of the program, and so forth.

Based on this session information, second screen manager 112 requests and receives an anchor from anchor generator 114 for each segment of the first-screen program on which an anchor is to be overlaid. The anchor encodes the session ID, and possible other information, as well, such as a timestamp that is incremented over the course of a program. First-screen content distributor 106 passes the original electronic image or video stream of the first-screen program to manager 112, which returns the image or stream to distributor 106 with the anchors overlaid in an appropriate location or locations. Alternatively, manager 112 may simply pass the anchors to distributor 106, which performs the overlay function itself. In either case, distributor 106 broadcasts or otherwise outputs the first-screen stream with overlaid anchors to a first-screen display 108, such as screen 24 or 62.

Mobile computing device 32 runs a second-screen application 110, as noted earlier. This application uses the capabilities of camera 44 and processor 42 to capture secondary images of display 108, detect anchors in these secondary images, and decode the digital values of the anchors. Application 110 transmits these digital values, along with an identification of the user of device 32, to second-screen server 40, and requests that server 40 provide the appropriate second-screen content. The user identification may correspond to a user profile that was previously created and stored on server 40, which enables the server to choose the second-screen content (such as promotional or social network content) most appropriate for the user.

A second-screen content server 116 function within server 40 receives the request from device 32 and matches the session ID decoded and transmitted by application 110 with information provided by content manager 112 regarding the session to which the ID belongs. Based on this information, content server 116 retrieves and downloads second-screen content to device 32. The second-screen content may include various items of information, for example, data such as URLs, audio, video, images and icons, as well as functional data such as screen positions of objects, permissions and visual appearance, to control and influence the behavior of application 110 on device 32 and other sorts of information listed above. The behavior of application 110 may change depending on the data obtained from content server 116. These changes may include, for example, playing or displaying the obtained data, or functional behavior such as enabling and disabling buttons and operations.

In some implementations, the information from content server 116 can be downloaded and cached in memory 46 on device 32, typically in the form of a database, prior to invoking a particular second-screen functionality. This sort of local storage is useful in reducing the response time of application 110 and the communication traffic load on server 40. In this case, when application 110 detects an anchor, the application will first query the local version of the database in memory 46. If the local query fails, application 110 will redirect the query to content server 116.

Figure 8:
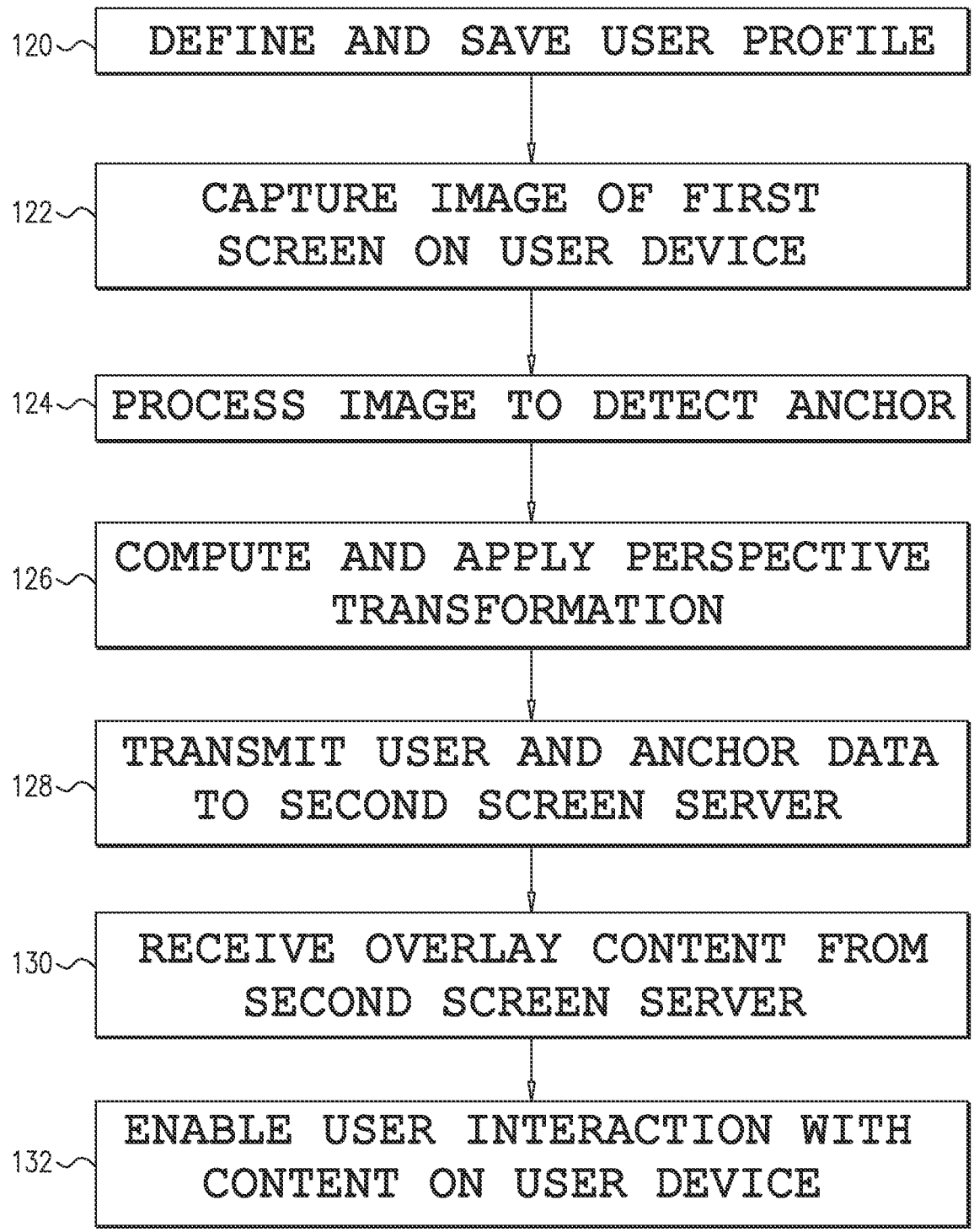
FIG. 8 is a flow chart that schematically illustrates a method for display synchronization, in accordance with an embodiment of the present invention.

FIG. 8 is a flow chart that schematically illustrates a method for display synchronization carried out on mobile computing device 32 (the client device), in accordance with an embodiment of the present invention. The elements of this method summarize systematically certain features of the embodiments that are described above. The particular order of the steps and the way in which they are carried out by application 110 are presented here solely by way of illustration. Alternative implementations will be apparent to those skilled in the art and are considered to be within the scope of the present invention.

As a preliminary step, after the user downloads and installs application 110 on device 32, but before beginning to receive second-screen content, the user may be prompted to create a user profile and to upload the profile to second-screen server 40, at a profile creation step 120. The profile identifies the user and client device, and may also include demographic information, preferences, social network links, and so forth.

Figure 9:
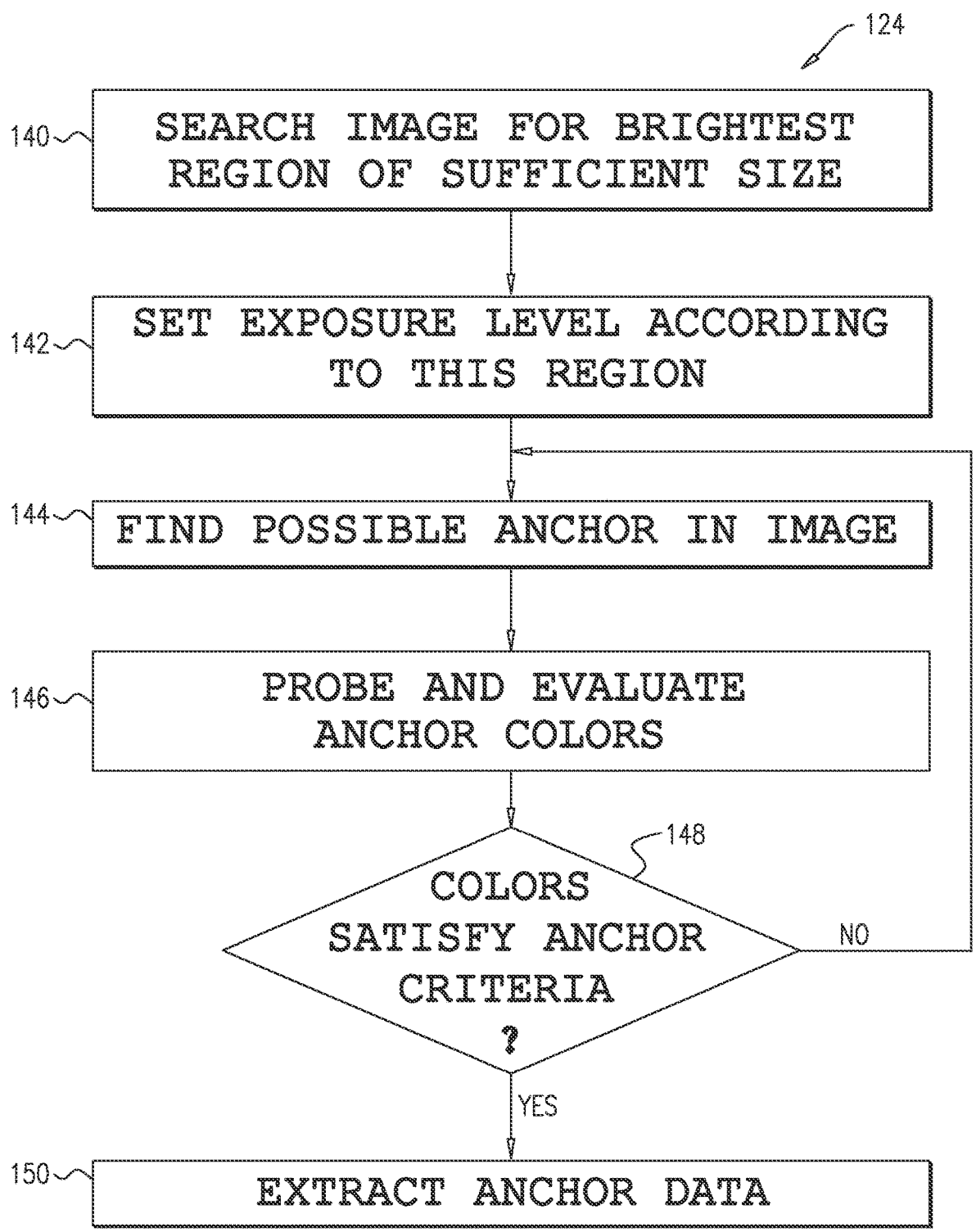
FIG. 9 is a flow chart that schematically illustrates a method for detecting and decoding a multi-color symbol in an image, in accordance with an embodiment of the present invention.

The user directs device 32 so that camera 44 captures a secondary image of screen 24, at an image capture step 122. Processor 42 processes the image in order to detect an anchor symbol, at an image processing step 124. Details of this step are shown in FIG. 9. Based on the detected anchor location, and assuming the vertices of the anchors occur at known coordinates on the first-screen display (for example, in the corners, as shown in FIG. 4), processor 42 computes the location and orientation of the primary image on screen 24 relative to the secondary image captured by camera 44. The processor applies the result in deriving the translational and rotational transformations needed to register screen 24 with screen 34, at a perspective transformation step 126. The primary image may also be cropped as necessary at this stage.

The position of mobile computing device 32 relative to screen 24 may be found accurately using the following method: When the size of the anchor displayed on screen 24 and the field of view of camera 44 are known, the detected size and shape of the anchor in the secondary image captured by the camera provide the rotational and translational transformations that govern the appearance of screen 24 in the video stream output by the camera. The size of the anchor displayed on screen 24 and the field of view of camera 44 provide the additional information necessary to convert the detected rotational and translational transformation to accurate positioning of screen 34 relative to screen 24. This method can be broadened to a general case of monitoring a user's paths through large indoor spaces, while navigating through the space as described in the above-mentioned PCT Patent Application PCT/IB2013/054540.

Alternatively, if the anchor vertex positions are variable and are not known in advance, step 126 may occur only after application 110 has requested and received information from second-screen server 40 regarding the vertex positions of the anchor that was identified at step 124.

Application 110 decodes the digital value of the detected anchor and transmits an indication of this value, along with user profile information, to server 40, at a second-screen request step 128. In response to this request, content server 116 transmits second-screen content to application 110, for overlay on screen 34, at a content download step 130. Detection of the anchor embedded in the primary display on screen 24 may also serve as a synchronization signal, enabling application 110 to update the second-screen content that it displays in accordance with changes in the first-screen images.

Application 110 enables user interaction with the second-screen content on display 34, at a user interaction step 132. This interaction may comprise passive actions, such as receiving additional information regarding items appearing on the first screen. Additionally or alternatively, application 110 may enable the user to invoke interactive functionality by operating the user interface of device 32, using touch screen features, for example, as explained above.

As yet another example of the sort of interactive features enabled at step 132, the user may join an ad-hoc social network relating to the first-screen content. For this purpose, an anchor is displayed as part of a first-screen broadcast, to enable the user to register in the social network. Registration may be activated by the user upon detection of the anchor, possibly using profile data stored on device 32 for automatic registration. It is possible to create this sort of social network only for the duration of a certain event or show. Since the user's details are pre-registered in application 110, it is sufficient that the anchor be detected in order to activate the registration in the social network automatically. In this manner, aiming camera 44 toward the anchor provides a simple way for the user to convey a wish to activate the registration process.

More generally, this method can be used for authentication in other settings: The user invokes the authentication process by applying device 32 to detect an anchor, which is coupled to any authentication procedure required for activation, such as gaining physical entry to a restricted compound, obtaining a position in a queue, or setting an appointment. After anchor detection, personal identification data stored on device 32 may be sent to a server in order to complete the authentication process and obtain the necessary approval.

FIG. 9 is a flow chart that schematically shows details of the methods used to identify and decode anchors in image processing step 124, in accordance with an embodiment of the present invention.

The first challenge in this regard is to capture an image, using camera 44, in which a candidate anchor is clearly visible. In many viewing scenarios, the illumination of the first-screen display is significantly brighter or different from the ambient illumination, causing the automatic exposure feature of the mobile device camera to set the camera exposure time to an interval that is not correct for anchor detection. In order to solve this problem, application 110 may cause processor 42 to search the images captured by camera 44 for the brightest region of a given minimal size, at an image searching step 140. The application then instructs the camera to set the point of interest for purposes of exposure (as well as focus) to be within the detected bright region, at an exposure setting step 142, thus enabling correct exposure for anchor detection.

Alternatively, when camera 44 allows its exposure time to be directly set, application 110 may vary the exposure interval from frame to frame in a cyclic manner, starting from the shortest exposure (suitable for bright first-screen scenarios), and increasing the exposure time in steps, for example by a factor of in each step. Since anchor detection is not very sensitive to intensity, one of the steps should have the correct exposure.

In either case, once an anchor is detected, the exposure time is locked at step 142 for a certain predefined time. The search for the correct exposure will restart only if this time interval passes without new anchor detection.

Once the exposure is correctly set, processor 42 analyzes the image captured by camera 44 in order to identify a possible anchor, at a candidate identification step 144. A "candidate" in this context is a vertex where edges between several regions of different colors meet, such that the number of regions and their edges satisfy the definition of anchor geometry that is provided by application 110. Processor 42 then probes and evaluates the colors of the regions around the vertex, as described above, at a probing step 146. Processor 42 checks whether the colors surrounding the vertex satisfy the predefined criteria for anchor colors, at a color checking step 148. For example, a candidate will qualify as an anchor only if none of the primary color channels has the same value over all of the regions surrounding the vertex.

Upon determining that the candidate is a valid anchor, processor 42 decodes the data encoded by the colors of the anchor, at a data extraction step 150. In addition, the processor may use the geometrical features of the anchor (such as the locations and distances between vertices) in computing the necessary perspective transformation at step 126. Otherwise, if the candidate is not found to be a valid anchor, processor 42 returns to step 144 and continues the search.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for presenting information, comprising:
   receiving a specified digital value for display;
   assigning to a set of colors respective digital codes comprising respective binary values representing three primary color components of the colors;
   encoding the specified digital value by combining at least four of the digital codes while selecting the colors such that none of the binary values is constant over all of the selected colors; and
   presenting a symbol for imaging by a computing device, the symbol comprising at least four regions meeting at a common vertex and having the colors selected so as to encode the specified digital value using the respective digital codes.

2. The method according to claim 1, wherein the symbol comprises multiple vertices encoding multiple, respective digital values depending on the colors of the regions that meet at each of the vertices, wherein the colors of the regions meeting at each of the multiple vertices are selected such that none of the binary values is constant over all of the regions meeting at any given vertex, and
   wherein the symbol encodes an extended digital value generated by combining the multiple, respective digital values encoded by the multiple vertices.

3. The method according to claim 1, wherein the colors of the regions are selected from a color group comprising red, green, blue, cyan, magenta and yellow, and having three-bit codes (1,0,0), (0,1,0), (0,0,1), (0,1,1), (1,0,1) and (1,1,0), respectively.

4. The method according to claim 3, wherein the color group further comprises black and white, having respective three-bit codes (0,0,0) and (1,1,1).

5. The method according to claim 1, and comprising capturing an image of the symbol, and decoding the symbol by probing the colors in the image at probe locations disposed at multiple angles around the common vertex.

6. The method according to claim 5, wherein the probe locations are all disposed at the same distance from the common vertex.

7. The method according to claim 1, wherein presenting the symbol comprises printing the symbol on a tangible medium.

8. The method according to claim 1, wherein presenting the symbol comprises generating a signal so as to cause the symbol to be presented on an electronic display.

9. An information system, comprising:
   a display, configured to present multiple symbols, each symbol comprising at least four regions meeting at a common vertex; and
   a server, configured to receive a specified digital value and an assignment of respective digital codes to a set of colors, the digital codes comprising respective binary values representing three primary color components of the colors,
   wherein the server is configured to encode the specified digital value by combining at least four of the digital codes while selecting the colors such that none of the binary values is constant over all of the selected colors, and to generate and transmit a symbol for presentation on the display, in which the at least four regions have the colors selected so as to encode the specified digital value using the respective digital codes, and
   where in the server is configured to receive a message from a client device indicating a digital value decoded by the client device upon capturing and analyzing an image containing one of the symbols, and to provide to the client device, in response to the message, an item of information corresponding to the digital value.

10. The system according to claim 9, wherein the item comprises a graphical element configured to be overlaid by the client device on a display of the image containing the one of the symbols.

11. A computer software product, comprising a tangible, non-transitory computer-readable medium in which program instructions are stored, which instructions, when read by a computing device, cause the device to capture an image of a symbol comprising at least four regions meeting at a common vertex and having different, respective colors selected so as to encode a specified digital value,
   wherein the specified digital value is encoded by assigning to each the colors respective digital codes comprising respective binary values representing three primary color components of the colors of the regions, and encoding the specified digital value by combining at least four of the digital codes while selecting the colors such that none of the binary values is constant over all of the selected colors, and wherein the instructions cause the computing device to process the image so as to decode the specified digital value.

12. The product according to claim 11, wherein the instructions cause the computing device to decode the symbol by probing the colors in the image at probe locations disposed at multiple angles around the common vertex.

13. The product according to claim 12, wherein the symbol comprises multiple vertices encoding multiple, respective digital values depending on the colors of the regions that meet at each of the vertices, and wherein the instructions cause the computing device to decode an extended digital value encoded by the symbol by decoding and combining the multiple, respective digital values encoded by the multiple vertices.

14. The product according to claim 11, wherein the instructions cause the computing device to decode the digital value by assigning the digital code to each color, and combining the digital codes to give the specified digital value.

15. A computing device, comprising:
an image sensor, configured to capture an image containing a symbol comprising at least four regions meeting at a common vertex and having different, respective colors selected so as to encode a specified digital value,
wherein the specified digital value is encoded by assigning to the colors respective a digital codes comprising respective binary values representing three primary color components of the colors of the regions, and encoding the specified digital value by combining at least four of the digital codes while selecting the colors such that none of the binary values is constant over all of the selected colors; and
a processor, which is configured to process the image so as to decode the specified digital value.

16. The device according to claim 15, and comprising a display, which is coupled to display the image captured by the image sensor, wherein the processor is configured to superimpose a graphical element on the display responsively to the digital value.

17. The device according to claim 16, and comprising a communication interface, wherein the processor is configured to send a message containing the digital value over a network to a server via the communication interface, and to receive the graphical element from the server in response to the message.

* * * * *